United States Patent
LiKamWa et al.

(10) Patent No.: US 12,069,453 B2
(45) Date of Patent: Aug. 20, 2024

(54) METHOD AND APPARATUS FOR TIME-DOMAIN CROSSTALK CANCELLATION IN SPATIAL AUDIO

(71) Applicant: Arizona Board of Regents on Behalf of Arizona State University, Scottsdale, AZ (US)

(72) Inventors: Robert LiKamWa, Tempe, AZ (US); Frank Wencheng Liu, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 183 days.

(21) Appl. No.: 17/433,797

(22) PCT Filed: Feb. 25, 2020

(86) PCT No.: PCT/US2020/019738
§ 371 (c)(1),
(2) Date: Aug. 25, 2021

(87) PCT Pub. No.: WO2020/176532
PCT Pub. Date: Sep. 3, 2020

(65) Prior Publication Data
US 2022/0141588 A1    May 5, 2022

Related U.S. Application Data

(60) Provisional application No. 62/811,450, filed on Feb. 27, 2019.

(51) Int. Cl.
*H04R 5/02* (2006.01)
*G06F 3/16* (2006.01)
(Continued)

(52) U.S. Cl.
CPC ............... *H04R 3/14* (2013.01); *G06F 3/165* (2013.01); *H04R 5/02* (2013.01); *H04R 5/04* (2013.01);
(Continued)

(58) Field of Classification Search
None
See application file for complete search history.

(56) References Cited

U.S. PATENT DOCUMENTS 6,243,476 B1 * 6/2001 Gardner .................. H04S 3/002
381/1
2003/0223602 A1 * 12/2003 Eichler ................... H04S 3/004
381/74
2017/0070838 A1 * 3/2017 Helwani ................. H04S 5/005

FOREIGN PATENT DOCUMENTS

WO    2020176532 A1    9/2020

OTHER PUBLICATIONS

Arteaga, D. "Introduction to Ambisonics," 2018.
(Continued)

*Primary Examiner* — Quynh H Nguyen
(74) *Attorney, Agent, or Firm* — Elliott, Ostrander & Preston, P.C.

(57) ABSTRACT

A system to output a cross-talk cancelled spatial audio signal to two speakers, including a user tracking module to provide a location and orientation of a head of a user, and a time-domain dynamic crosstalk cancellation module to receive a spatial audio signal, the location and orientation of the head of the user from the user tracking module, a location for each of the two speakers, and generate the time-domain crosstalk cancelled spatial audio signal based thereon.

5 Claims, 8 Drawing Sheets

(51) Int. Cl.
- *H04R 3/14* (2006.01)
- *H04R 5/04* (2006.01)
- *H04S 1/00* (2006.01)
- *H04S 7/00* (2006.01)

(52) U.S. Cl.
CPC .............. *H04S 1/007* (2013.01); *H04S 7/303* (2013.01); *H04S 2400/11* (2013.01)

(56) References Cited

OTHER PUBLICATIONS

International Search Report and Written Opinion for Application No. PCT/US20/19738, dated Jul. 27, 2020, 13 pages.

Kim, S. et al., "Adaptive Virtual Surround Sound Rendering System for an Arbitrary Listening Position," JAES vol. 56 Issue 4, 2008, pp. 243-254.

Kurabayashi, H. et al., "Development of dynamic transaural reproduction system using non-contact head tracking," 2013 IEEE 2nd Global Conference on Consumer Electronics (GCCE), 2013, pp. 12-16, IEEE.

Pulkki, V., "Virtual Sound Source Positioning Using Vector Base Amplitude Panning," Journal of the Audio Engineering Society, 45(6), 1997, pp. 456-466.

Song, M. et al., "An Interactive 3-D Audio System with Loudspeakers," IEEE Transactions on Multimedia, vol. 13, No. 5, 2011, pp. 844-855.

Yang, J. et al., "Spatial Audio for Human-Object Interactions in Small AR Workspaces," Proceedings of the 16th Annual International Conference on Mobile Systems, Applications, and Services (MobiSys '18). Association for Computing Machinery, 2018, 518.

* cited by examiner

METHOD AND APPARATUS FOR TIME-DOMAIN CROSSTALK CANCELLATION IN SPATIAL AUDIO

CLAIM OF PRIORITY

This Application is a U.S. National Phase application under 35 U.S.C. §371 of International Application No. PCT/US20/19738, filed Feb. 25, 2020, entitled "METHOD AND APPARATUS FOR TIME-DOMAIN CROSSTALK CANCELLATION IN SPATIAL AUDIO" and this application further claims the benefit of U.S. Provisional Application No. 62/811,450, filed Feb. 27, 2019, the entire contents of which are hereby incorporated by reference herein as though set forth in full.

GOVERNMENT RIGHTS AND GOVERNMENT AGENCY SUPPORT NOTICE

This invention was made with government support under 1932377 awarded by the National Science Foundation. The government has certain rights in the invention.

TECHNICAL FIELD

Embodiments of the invention relate to real time spatial audio for an Internet-of-Things (IoT) audio speaker hub, an in particular, cancelling crosstalk in spatial audio transmitted from a pair of speakers.

BACKGROUND

In general, the term "spatial audio" is used to mean audio that is not monaural (where, with headphones, a user hears the exact same thing from the left and right sides of the headset). One form of spatial audio, Binaural audio, provides a fully 360-degree soundscape through a specially-encoded stereo file that has to be experienced through headphones. It models the way sound reaches and reflects around a user's head. A user can hear sound in every direction, but the audio is not responsive to user input, so if the user moves their head, the audio doesn't change accordingly. This type of spatial audio may be referred to as "head-locked" audio.

What is needed is spatial audio that provides a fully 360-degree soundscape that is responsive to the location of the user and the user's visual field, in the absence of headphones, so that when a user positions or moves their head in one direction or another, the spatial audio is modified to reflect that movement.

Spatial audio—the ability to discern directionality of sound—would add significant richness to the Internet of Things (IoT) application space. Virtual multidirectional sounds could bring to life an audio-based home guidance system or search engine. Smart speakers on IoT hubs, e.g., Amazon Echo or Google Home, do not currently provide spatial audio to the users; instead, the audio sounds like it emanates directly from the device. What is needed is a system that leverages existing IoT infrastructure to create audio that sounds like it emanates from physical locations other than the speaker.

Current speakers on IoT hubs are not capable of providing spatial audio experiences, that is, the speakers cannot output a reproduction of sound one can hear in real life. Unlike headphones, where a first or left audio channel of the spatial audio signal is separately transmitted to one (left) side of the headphones, and a second or right audio channel of the spatial audio signal is separately transmitted to the other (right) side of the headphones, so that the user only hears the left audio channel in the left ear and the right audio channel in the right ear, when spatial audio is transmitted from a pair of speakers, the user's left ear receives both the left and right audio channels, and the user's right ear receives both the left and right audio channels. Additionally, current state of the art spatial audio techniques do not scale to IoT needs, due to high cost, maintenance, and latency.

Voice assistants and smart IoT speaker hubs have risen in popularity the past few years. The interactions of these voice assistants are limited to simple tasks such as playing music, users asking for information, and turning on or off some appliance. These smart speaker hubs are not capable of providing spatial audio experiences to users. The integration of spatial audio into these smart IoT speaker hubs would add more depth into the interactions and enable new immersive experiences.

Binaural synthesis processing frameworks, e.g., Resonance Audio, a spatial audio software development kit (SDK) available from Google, based on technology from Google's VR Audio SDK, which works at scale across mobile and desktop platforms, translate spatial virtual sound environments into two-channel audio signals delivered through headphones. However, delivering spatial audio through loudspeakers creates crosstalk, where unwanted sound from each speaker reaches a user's far (or opposite) ear.

Wave field synthesis (WFS) creates the effect by carefully synchronizing speaker arrays, which is both expensive and non-scalable. WFS is a spatial audio rendering technique, characterized by creation of virtual acoustic environments. It produces artificial wavefronts synthesized by a large number of individually driven loudspeakers. Such wavefronts seem to originate from a virtual audio source. Contrary to traditional spatialization techniques such as stereo or surround sound, the localization of virtual audio sources in WFS does not depend on or change with the listener's position.

Ambisonic and amplitude panning systems create the effect by controlling the amplitude of surrounding loudspeakers, limiting the virtual sounds to a line segment between loudspeakers. Dynamic crosstalk cancellers use pairs of loudspeakers to create spatial audio for a tracked user through frequency-domain audio processing but have issues with high latency and inaccuracy or require significant calibration to model a listening environment (e.g., a room) and user's transfer function.

Existing spatial audio techniques for speaker systems are limited due to high cost, high computation, and user mobility. Achieving the spatial audio effect is difficult for speaker systems because of crosstalk, where unwanted sound from each speaker reaches the opposite ear. Some spatial audio speaker systems utilize beam forming techniques which deliver directed sound cones to a user's ears, while other speaker systems utilize a careful synchronization of amplitudes for multiple speakers to create the effect. In both cases, to achieve the 360-degree soundscape effect, the user must be surrounded by speakers which is neither cost efficient nor practical in a home setting. There are existing algorithms which cancel out crosstalk relying on filtering head related transfer functions filters with the input sound. Nonetheless these crosstalk cancellers significantly limit a user's head movement while the head related transfer functions are highly burdensome to compute. These filters require incredibly high update rates in the frequency domain which creates high latency and incredibly high computational costs which are not available on IoT devices. What is needed is techniques that provide a hands-free, headset-free spatial audio system which implements a specialized time domain crosstalk cancellation system that can be easily integrated into existing speaker infrastructures, with high update rates and low computational cost, for a dynamic user in a multitude of environments, without relying on head related transfer function filtering or measuring the acoustic properties of a room for a dynamically moving user, and which do not need to rely on an entire array of speakers.

SUMMARY

A system to output cross-talk cancelled spatial audio to a plurality of speakers includes a user tracking module to provide a position and orientation of a head of a user. A time-domain dynamic crosstalk cancellation module receives a spatial audio signal, the position and orientation of the head of the user from the user tracking module, and performs time-domain crosstalk cancellation on the spatial audio. A plurality of speakers then receive and output the crosstalk cancelled spatial audio.

BRIEF DESCRIPTION OF THE DRAWINGS

Embodiments are illustrated by way of example, and not by way of limitation, and will be more fully understood with reference to the following detailed description when considered in connection with the following figures.

WRITTEN DESCRIPTION

Embodiments of the invention relate to a distributed spatial audio system that uses time-domain crosstalk cancellation among a multi-speaker system, for example, an IoT multi-speaker system, to position virtual audio sources throughout a room. The embodiments are generalizable to a wide variety of home situations and provide robust real time spatial audio for a user. Embodiments are able to emanate sounds in a manner in which the user perceives that the sounds are coming from locations other than the locations of the speakers.

Sound localization is a listener's ability to identify the location, source, or origin of a sound in both direction and distance. Humans, and other mammals as well, use several cues for sound source localization, including inter-aural time- and level-differences (or intensity- or amplitude- or loudness- or frequency distribution-differences) between both ears. The underlying physics is straightforward: when sound travels through space it attenuates/decays as the distance over which the sound travels increases; likewise, it takes more time for sound to travel as the distance over which the sound travels increases as well. So for distance from each speaker to each ear of the user, there is a different amplitude decay and a different amount of time delay at which the ear hears an audio signal. In particular, the inter-aural level (or intensity) difference is the difference in loudness and frequency distribution between a user's two ears. As sound travels, its strength dissipates. Moreover, the user's head casts an acoustic shadow, which changes the loudness and frequency distribution of sound going to each ear. The acoustic shadow may be defined as the area on the side of the head opposite from the source of a sound in which the loudness of a sound is less because of blocked sound waves. The acoustic shadow is more prominent for high-frequency sounds than for low-frequency sounds. The inter-aural time difference is the difference in arrival time of a sound between two ears. This difference in arrival time provides a cue to the direction or angle of the sound source from the user's head. If a signal arrives at the head from one side, the signal has further to travel to reach the far ear than the near ear. This path length difference results in a time difference between the sound's arrivals at the ears, which is detected and aids the process of identifying the direction of sound source.

Figure 3:
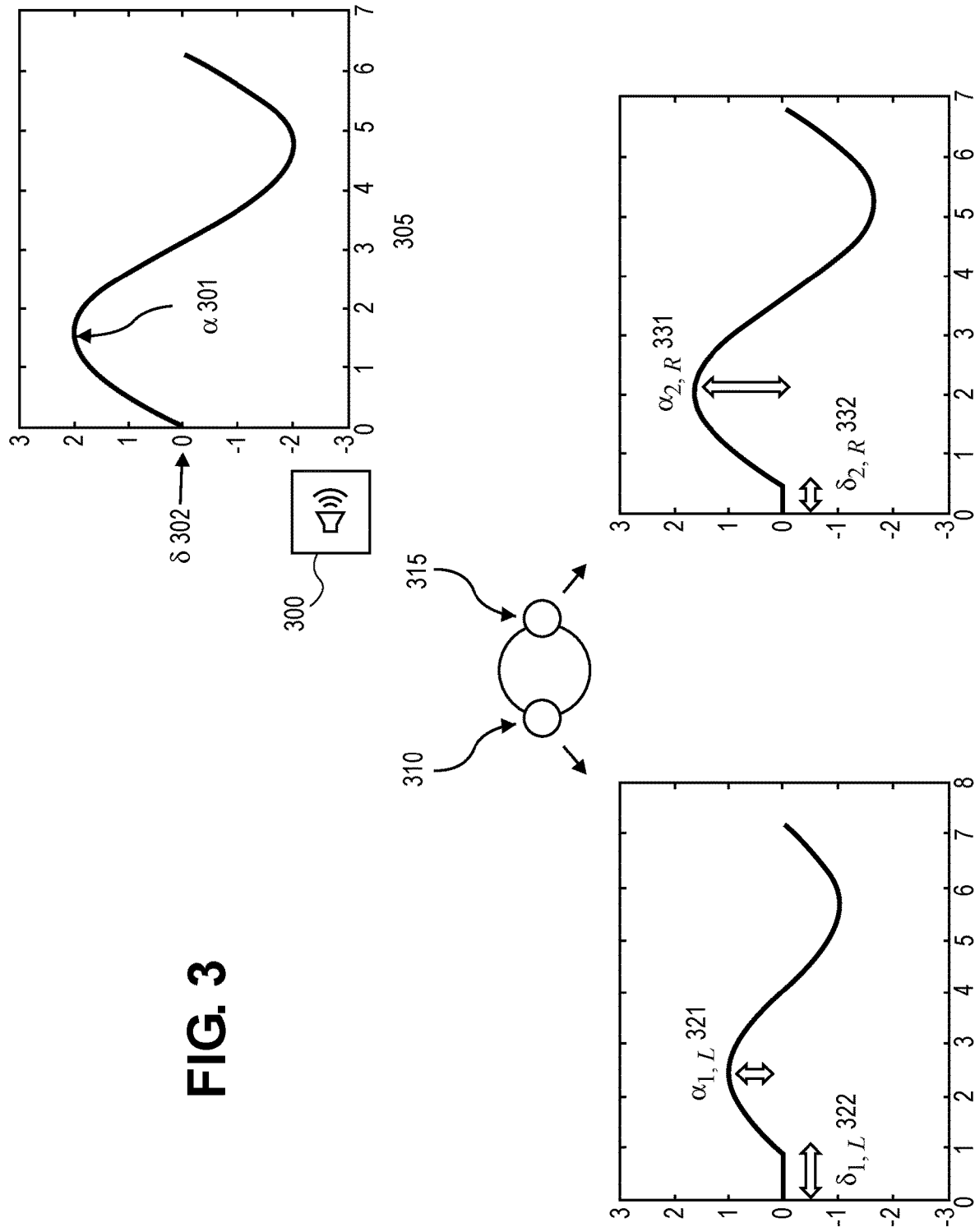
FIG. 3 depicts how as sound delays and decays as it travels over distance.

For example, with reference to FIG. 3, a sound source 300 generates a sound, depicted as a soundwave in graph 305, having an amplitude, $\alpha$ 301 of 2 and a time delay, $\delta$ 302 of zero. When the sound travels from the sound source to the left ear 310 of the user, there is an amplitude decay from $\alpha$ 301 of 2 to $\alpha_1$ 321 of 1, and when the sound travels from the sound source to the right ear 315 there is an amplitude decay from $\alpha$ 301 of 2 to $\alpha_2$ 331 of approximately 1.5, given that the sound source is closer to the right ear than the left ear of the user. Likewise, there is an inter-aural time difference is the difference in arrival time of a sound between two ears. When the sound travels from the sound source to the left ear 310 of the user, there is a time delay from $\delta$ 302 of zero to $\delta_1$ 322 of approximately 1, and when the sound travels from the sound source to the right ear 315 there is a time delay from $\delta$ 302 of zero to $\delta_2$ 332 of approximately 0.5, given that the sound source is closer to the right ear than the left ear of the user. This difference in arrival time provides a cue to the direction or angle of the sound source from the user's head. If a signal arrives at the head from one side, the signal has further to travel to reach the far ear than the near ear. This path length difference results in a time difference between the sound's arrivals at the ears, which is detected and aids the process of identifying the direction of sound source.

Embodiments of the invention, knowing those distances, manipulate the original spatial audio signals transmitted to each speaker, and combine them in a way to create the modified spatial audio signals. The speakers then transmit these modified spatial audio signals.

Embodiments of the invention take into consideration how humans use cues for sound source localization, in particular, how humans rely on the time- and level-differences between both ears, to modify spatial audio so that the listener perceives a particular location, source, or origin of the sound, even as the listener moves about and changes the orientation of their head. This 360 degree spatial audio effect may be achieved with just two speakers.

In particular, embodiments of the invention, given the respective locations of the pair of speakers and the location and orientation of the user's head, calculate the distance between each speaker and each of the user's ears, modify the spatial audio signal transmitted from one (a first) of the pair of speakers by adjusting (e.g., delaying) one or more of the time and amplitude at which the spatial audio is transmitted from the first speaker to one of the user's ears (say, the left ear), and likewise modify the spatial audio signal transmitted from the other (a second) of the pair of speakers by adjusting (e.g., delaying) one or more of the time and amplitude at which the spatial audio signal is transmitted from the second speaker to the user's other ear (the right ear).

Additionally, each speaker transmits an inverted copy of the modified spatial audio signal transmitted by the other speaker. This is because a user's left ear hears both the modified spatial audio signal from the first speaker, and the modified spatial audio signal from the second speaker, creating crosstalk, while the user's right ear also hears both the modified spatial audio signal from the first speaker and the second speaker. The inverted copy of the modified spatial audio signal from the first speaker cancels out the modified spatial audio signal from the second speaker so that the left ear only hears the modified spatial audio signal from the first speaker. Likewise, the inverted copy of the modified spatial audio signal from the second speaker cancels out the modified spatial audio signal from the first speaker so that the right ear only hears the modified spatial audio signal from the speaker.

The modified spatial audio signal from the one speaker and the inverted copy of the modified spatial audio signal from the other speaker cancel each other out (i.e., the crosstalk is canceled), so the user only hears in each ear the modified spatial audio signal transmitted by a different speaker. In particular, the modified spatial audio signal from the second speaker and the inverted copy of the modified spatial audio signal from the first speaker cancel each other out so the user only hears in the left ear the modified spatial audio signal transmitted by the first speaker. Likewise, the modified spatial audio signal from the first speaker and the inverted copy of the modified spatial audio signal from the second speaker cancel each other out, so the user only hears in the right ear the modified spatial audio signal transmitted by the second speaker.

In this manner, embodiments of the invention, knowing where the speakers are located, and where the user's ears are located, can generate sounds that come from the speakers such that when they arrive at the user's ears, the right ear hears just right spatial audio signal, and left ear hears just left spatial audio signal, even though the user is not wearing headphones. That is, the user hears spatialized audio from the pair of speakers, wherein the left ear hears the left spatial audio signal and the right ear hears the right spatial audio signal. Further in this manner, embodiments of the invention can pinpoint any location, as the location, source, or origin of a spatial audio signal, essentially tricking the user into perceiving the spatial audio signal as coming from a particular location or source that may or may not be the actual location of the source of the spatial audio signal, i.e., the location of the speakers.

Spatial audio offers deeper immersion and incredibly realistic audio experiences. A low-cost, ubiquitous, headset and hands free system according to the disclosed embodiments can be integrated into existing IoT environments opening up new auditory opportunities for entertainment and in-home care. For example, 360 degree videos can transport a user both visually and aurally. Another example is where voice assistants on smart electronic devices can create spatial sound cues to aurally direct a user to the location of objects, including speaker-less, muted, or turned off consumer electronic devices or objects.

Figure 1:
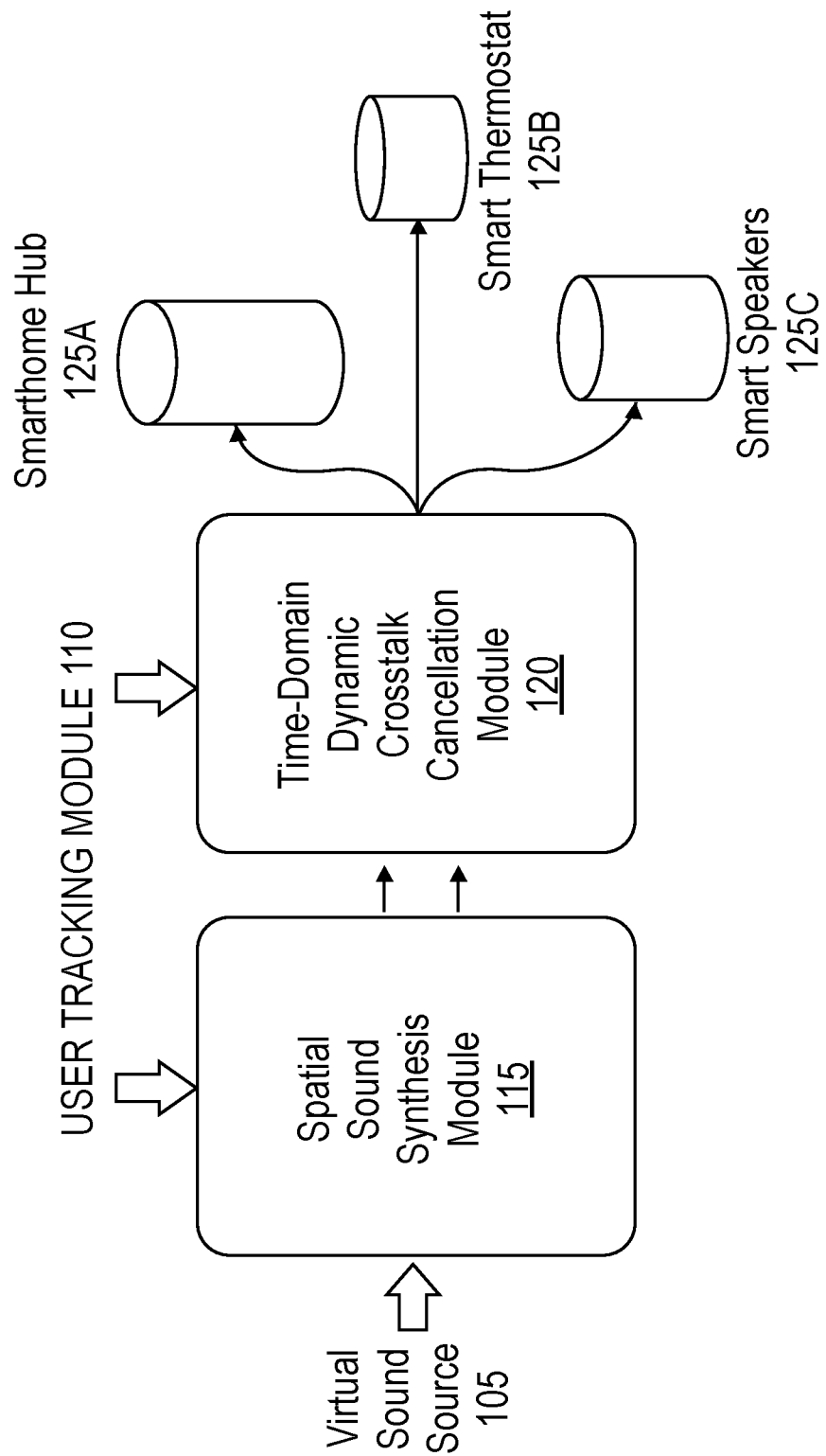
FIG. 1 illustrates an embodiment of the invention.

Embodiments of the invention relate to spatial audio systems built from existing IoT infrastructure, and that adapt to the user and environment. With reference to FIG. 1, the embodiments contemplate a distributed spatial audio system (FIG. 1), revolving around a time-domain dynamic crosstalk cancellation technique which uses amplitude gain and time delay modifications for real-time low-latency spatial audio.

In particular, embodiments of the invention include a virtual sound source 105, such as a game engine, to provide virtual sounds. In another embodiment, video cameras can capture live video, while binaural or ambisonic microphones concurrently can capture live audio, and a computer program can map the audio to the video and create a VR video. A user tracking module, e.g., a virtual reality tracking module 110 provides the position and orientation of a user's head. Alternatively, one or more video cameras and/or thermographic or thermal imaging (infrared) cameras captures the position (location and elevation) and orientation of the user's head.

A spatial sound synthesis module 115, such as a binaural synthesis processing engine, receives the virtual sounds placed in a virtual space from the virtual sound source 105, and receives the position and orientation of the user's head from the user tracking module 110, and generates the left and right spatial audio signals so that it appears the sound is coming from a particular direction and location. In one embodiment, the virtual sound source may already provide a spatial audio signal, in which case, module 115 is unnecessary.

The output of module 115—a spatialized audio signal comprising two synchronized channels, one destined for a user's left ear—a left channel, and one destined for the user's right ear—a right channel, is what would typically be transmitted to the left and right sides of a headphone. However, to transmit these separate channels from speakers and preserve the spatial audio signal, embodiments of the invention include a time-domain dynamic crosstalk cancellation module 120. Module 120 receives the spatial audio signal from the spatial sound synthesis module 115. Module 120 does not need to know the location and direction of the source of the sound embodied in the spatial audio signal. Module 120 simply preserves the left and right audio channels of the spatial audio signal, as synchronized, so that the left and right channels reach the left and right ears of the user at the correct time and correct amplitude, regardless of the location of the user's head and the orientation of the user's head relative to the locations of the speakers. To this end, module 120 receives the position and orientation of the user's head from the user tracking module 110, and performs time-domain crosstalk cancellation according to the algorithm discussed below.

Figure 2:
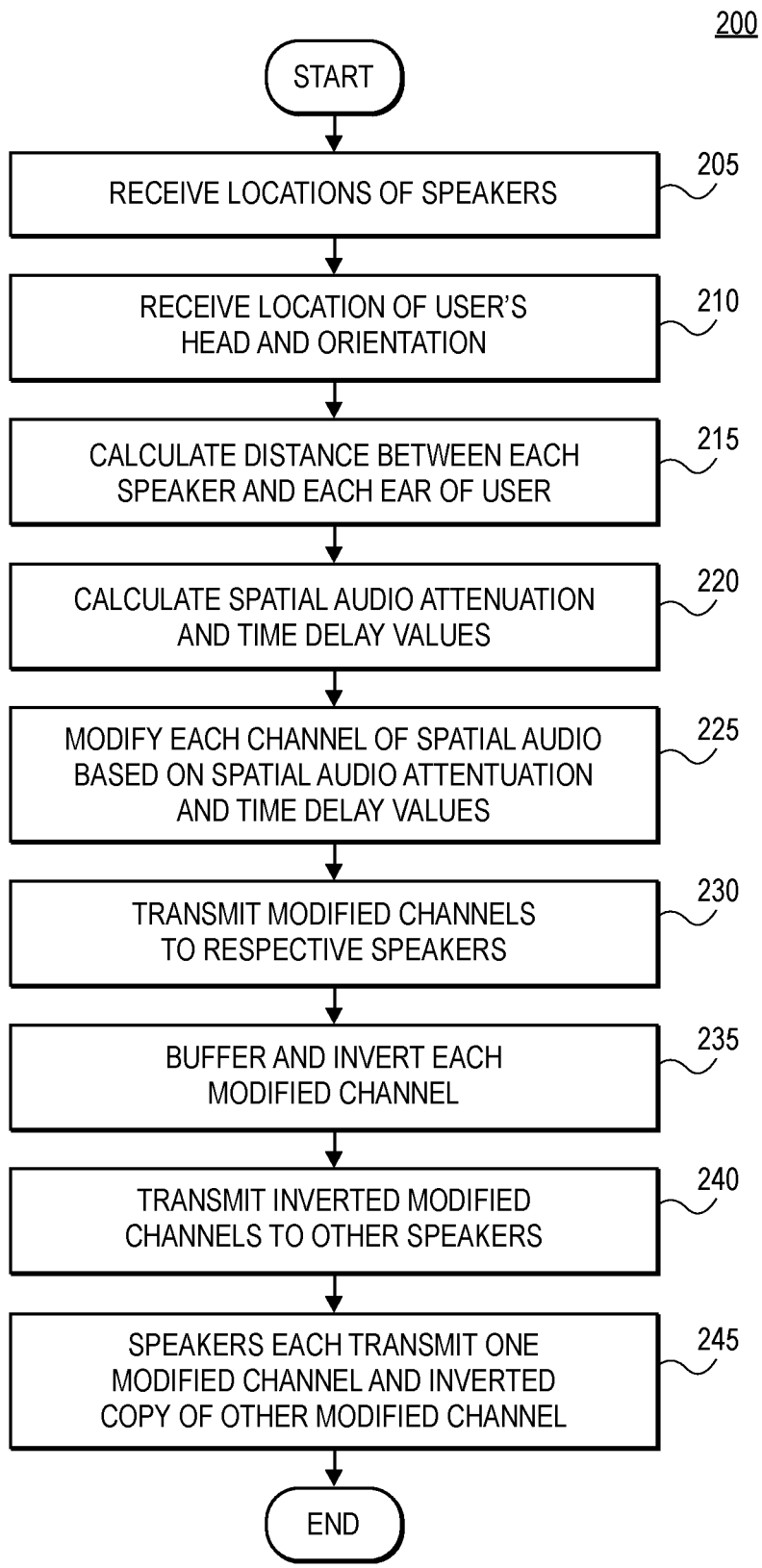
FIG. 2 is a flow chart in accordance with an embodiment of the invention.

With reference to the functional block diagram in FIG. 1 and the flow chart 200 in FIG. 2, according to one embodiment, module 120 receives as input the locations of the two speakers at 205. This input may be provided manually, for example, a user may as part of a set up routine configure the locations of the speakers. Alternatively, a camera, video camera, web camera, etc., may capture the locations of the speakers, or the speakers may transmit their own location as metadata. Likewise, module 120 receives as input the location and the user's head and the orientation of the user's head at 210. This input may be provided on a real-time basis by a virtual reality (VR) headset, or a video camera or other imaging device or technology. Embodiments then calculate at 215 the distance between each speaker and each ear of the user, and then calculate at 220 a spatial audio signal attenuation or decay value, and a spatial audio signal time delay value, for each channel of the spatial audio signal. This calculation can be a simple time-distance calculation given the distances calculated at 215, and knowing the speed of sound.

The module 120 then modifies by applying the respective decay value and time delay value to each channel of the spatial audio signal at 225, and transmits at 230 the modified channels to respective speakers, one modified channel being transmitted to one speaker—a first modified channel transmitted to a first speaker, the other modified channel being transmitted to the other speaker—a second modified channel transmitted to the second speaker. Additionally, module 120 captures and buffers each modified channel as it is being transmitted, inverts it at 235, and transmits it to the other speaker, at 240.

Each speaker, then, transmits, at 245, one modified channel and one inverted copy of the other modified channel. In particular, the first speaker transmits a first modified channel, and an inverted copy of the second modified channel, and the second speaker transmits a second modified channel, and an inverted copy of the first modified channel. A user's left ear receives three channels—the first modified channel and the inverted copy of the second modified channel from the first speaker, and the second modified channel from the second speaker. The inverted copy of the second modified channel from the first speaker and the second modified channel from the second speaker cancel each other out ("crosstalk cancellation), and so the user's left ear just hears the first modified channel. Likewise, the user's right ear receives three channels—the second modified channel and the inverted copy of the first modified channel from the second speaker, and the first modified channel from the first speaker. The inverted copy of the first modified channel from the second speaker and the first modified channel from the first speaker cancel each other out, and so the user's right ear just hears the second modified channel. As such, the user hears the original spatial audio signal.

Of course, as the user moves around, and/or the orientation of the user's head changes, steps 210-235 are repeated frequently, thereby achieving dynamic, real-time, crosstalk cancellation of the spatial audio signal as it is transmitted from the speakers to the user.

Further details of embodiments of the invention are described below.

$I_L$ and $I_R$ represent the two input audio channels to be modified by the dynamic crosstalk cancellation technique according embodiments of the invention, and two speakers are represented by $S_1$ and $S_2$. The user's ears are represented by $E_L$ and $E_R$. The amplitude decay from a loudspeaker to a user's ear is represented by $\alpha_{source,destination}$. The time it takes for the audio signal to travel from a loudspeaker to the user's ear is represented by $\delta_{source,destination}$.

Embodiments calculate the $\alpha_{source,destination}$, by measuring the decibel drop of each speaker playing guassian white noise over distance, fitting the change in decibel drop as a function of distance. Embodiments calculate $\delta_{source,destination}$ as $$\frac{distance from ear to speaker}{speed\ of\ sound}$$

Figure 4B:
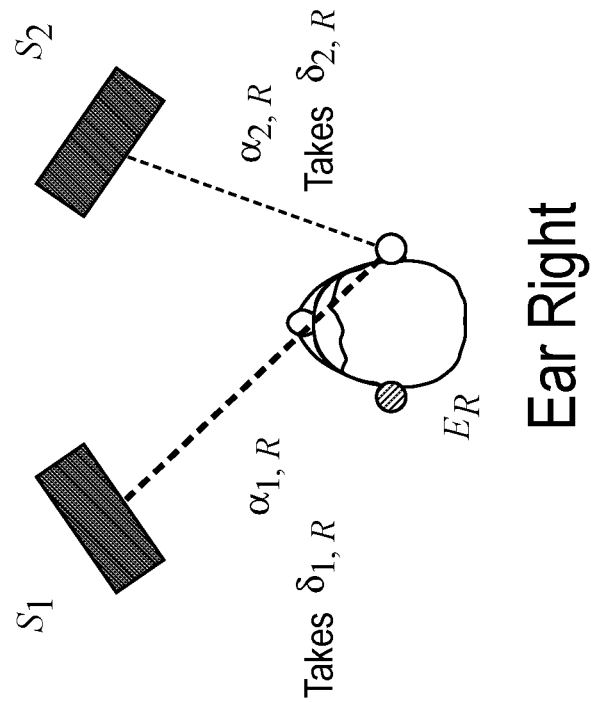
FIGS. 4A and 4B illustrate an embodiment of the invention.
Figure 4A:
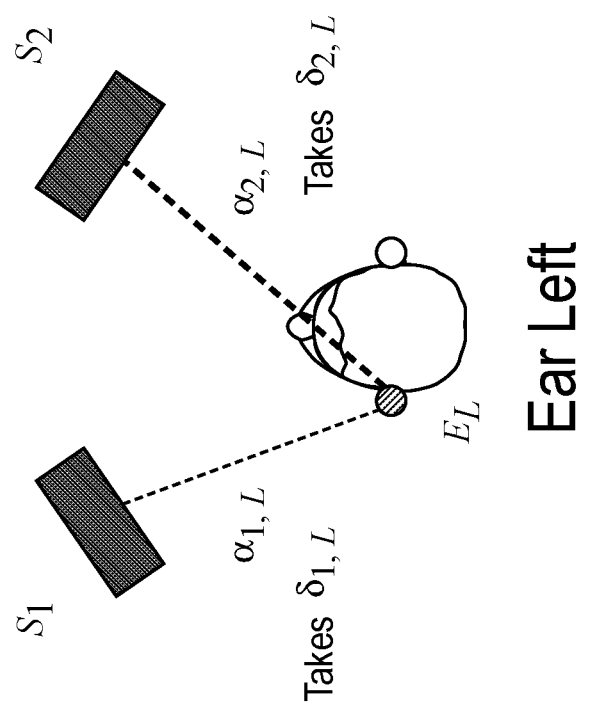

FIGS. 4A and 4B respectively model what the left and right ears hear from the speakers S1 and S2. What each ear hears is a combination of the sound from the first speaker with some amplitude decay and time delay and the sound from the second speaker with some amplitude decay and time delay.

$$E_L(t) = \alpha_{1,L}(S_1(t-\delta_{1,L})) + \alpha_{2,L}(S_2(t-\delta_{2,L})) \quad (1)$$

$$E_R(t) = \alpha_{2,R}(S_2(t-\delta_{2,R})) + \alpha_{1,R}(S_1(t-\delta_{1,R})) \quad (2)$$

Ideally, embodiments strive for what a user's ears hear to equal the channel inputs.

$$E_L(t) = I_L(t)$$

$$E_R(t) = I_R(t)$$

This does not occur instantaneously. So there will be some delay in what the user hears at each ear. $\Delta$ represents that delay, which is consistent in both $I_L$ and $I_R$.

$$E_L(t) = I_L(t-\Delta) \quad (3)$$

$$E_R(t) = I_R(t-\Delta) \quad (4)$$

Embodiments relate input channel signals to the speaker signals. To do so, embodiments set $E_L(t)$ to $I_L(t-\Delta)$ and $E_R(t)$ to $I_R(t-\Delta)$. Embodiments relate the corresponding $S_1(t)$ to $I_L(t)$, $S_2(t)$ to $I_R(t)$ so that when the speaker values are inserted back into equations (1) and (2), the crosstalk portion is canceled out.

Embodiments solve for $S_1$ from equation (1).

$$E_L(t) = \alpha_{1,L}(S_1(t-\delta_{1,L})) + \alpha_{2,L}(S_2(t-\delta_{2,L}))$$

$$I_L(t-\Delta) = \alpha_{1,L}(S_1(t-\delta_{1,L})) + \alpha_{2,L}(S_2(t-\delta_{2,L}))$$

$$\alpha_{1,L}(S_1(t-\delta_{1,L})) = I_L(t-\Delta) - \alpha_{2,L}(S_2(t-\delta_{2,L}))$$

$$S_1(t-\delta_{1,L}) = \frac{1}{\alpha_{1,L}} I_L(t-\Delta) \frac{\alpha_{2,L}}{\alpha_{1,L}}(S_2(t-\delta_{2,L})) \quad (5)$$

$$S_1(t) = \frac{1}{\alpha_{1,L}} I_L(t-\Delta+\delta_{1,L}) \frac{\alpha_{2,L}}{\alpha_{1,L}}(S_2(t-\delta_{2,L}+\delta_{1,L})) \quad (6)$$

Embodiments solve for $S_2$ from equation (2).

$$E_R(t) = \alpha_{2,R}(S_2(t-\delta_{2,R})) + \alpha_{1,R}(S_1(t-\delta_{1,R}))$$

$$I_R(t-\Delta) = \alpha_{2,R}(S_2(t-\delta_{2,R})) + \alpha_{1,R}(S_2(t-\delta_{1,R}))$$

$$\alpha_{2,R}(S_2(t-\delta_{2,R})) = I_R(t-\Delta) - \alpha_{1,R}(S_1(t-\delta_{1,R}))$$

$$S_2(t-\delta_{2,R}) = \frac{1}{\alpha_{2,R}} I_R(t-\Delta) - \frac{\alpha_{1,R}}{\alpha_{2,R}}(S_1(t-\delta_{1,R})) \quad (7)$$

$$S_2(t) = \frac{1}{\alpha_{2,R}} I_R(t-\Delta+\delta_{2,R}) - \frac{\alpha_{1,R}}{\alpha_{2,R}}(S_1(t-\delta_{1,R}+\delta_{2,R})) \quad (8)$$

Now that the equations are written in terms of I and S, embodiments find $S_2$ in equation (6) and $S_1$ in equation (8).

$$S_2(t-\delta_{2,L}+\delta_{1,L}) = \frac{1}{\alpha_{2,R}} I_R(t-\Delta+\delta_{2,R}-\delta_{2,L}+\delta_{1,L}) - \frac{\alpha_{1,R}}{\alpha_{2,R}}(S_1(t-\delta_{1,R}+\delta_{2,R}-\delta_{2,L}+\delta_{1,L})) \quad (9)$$

$$S_1(t-\delta_{1,R}+\delta_{2,R}) = \frac{1}{\alpha_{2,R}} I_L(t-\Delta+\delta_{1,L}-\delta_{1,R}+\delta_{2,R}) - \frac{\alpha_{2,L}}{\alpha_{1,L}}(S_2(t-\delta_{2,L}+\delta_{1,L}-\delta_{1,R}+\delta_{2,R}))) \quad (10)$$

Equations (6) and (8) and then expanded. Audio is processed through audio buffers on the computer. Embodiments ensure that inside the Signal(t−number), the number value is positive. By having positive values, embodiments are able to access audio buffer values from the past. Therefore number value in Signal(t−number) is positive.

Equation (6) is expanded by inserting it into equation (9).

$$S_1(t) = \frac{1}{\alpha_{1,L}} I_L(t - \Delta + \delta_{1,L}) - \frac{\alpha_{2,L}}{\alpha_{1,L}} \left( \frac{1}{\alpha_{2,R}} (I_R(t - \Delta + \delta_{2,R} - \delta_{2,L} + \delta_{1,L})) - \frac{\alpha_{1,R}}{\alpha_{2,R}} (S_1(t - \delta_{1,R} + \delta_{2,R} - \delta_{2,L} + \delta_{1,L})) \right) \quad (11)$$

Simplifying we get $$S_1(t) = \frac{1}{\alpha_{1,L}} I_L(t - \Delta + \delta_{1,L}) - \frac{\alpha_{2,L}}{\alpha_{1,L}\alpha_{2,R}} I_R(t - \Delta + \delta_{2,R} - \delta_{2,L} + \delta_{1,L}) + \frac{\alpha_{2,L}\alpha_{1,R}}{\alpha_{1,L}\alpha_{2,R}} S_1(t - \delta_{1,R} + \delta_{2,R} - \delta_{2,L} + \delta_{1,L}) \quad (12)$$

We expand equation (8) by plugging equation (10).

$$S_2(t) = \frac{1}{\alpha_{2,R}} I_R(t - \Delta + \delta_{2,R}) - \frac{\alpha_{1,R}}{\alpha_{2,R}} \left( \frac{1}{\alpha_{1,L}} (I_L(t - \Delta + \delta_{1,L} - \delta_{1,R} + \delta_{2,R})) - \frac{\alpha_{2,L}}{\alpha_{1,L}} (S_2(t - \delta_{2,L} + \delta_{1,L} - \delta_{1,R} + \delta_{2,R})) \right) \quad (13)$$

Simplifying we get $$S_2(t) = \frac{1}{\alpha_{2,R}} I_R(t - \Delta + \delta_{2,R}) - \frac{\alpha_{1,R}}{\alpha_{2,R}\alpha_{1,L}} I_L(t - \Delta + \delta_{1,L} - \delta_{1,R} + \delta_{2,R}) + \frac{\alpha_{1,R}\alpha_{2,L}}{\alpha_{1,L}\alpha_{2,R}} S_2(t - \delta_{2,L} + \delta_{1,L} - \delta_{1,R} + \delta_{2,R}) \quad (14)$$

To ensure audio buffer conditions, $$\Delta > \delta_{2,R} - \delta_{2,L} + \delta_{1,L}$$

$$\Delta > \delta_{1,L} - \delta_{1,R} + \delta_{2,R}$$

Which result in $$\Delta > \delta_{1,L} + \delta_{2,R} - \min(\delta_{1,R}, \delta_{2,R})$$

Embodiments prepare equation (12) and equation (14) to be put back into the crosstalk equations (1) and (2).

$$S_1(t - \delta_{1,L}) = \frac{1}{\alpha_{1,L}} I_L(t - \Delta) - \frac{\alpha_{2,L}}{\alpha_{1,L}\alpha_{2,R}} I_R(t - \Delta + \delta_{2,R} - \delta_{2,L}) + \frac{\alpha_{2,L}\alpha_{1,R}}{\alpha_{1,L}\alpha_{2,R}} S_1(t - \delta_{1,R} + \delta_{2,R} - \delta_{2,L}) \quad (15)$$

$$S_2(t - \delta_{2,R}) = \frac{1}{\alpha_{2,R}} I_R(t - \Delta) - \frac{\alpha_{1,R}}{\alpha_{2,R}\alpha_{1,L}} I_L(t - \Delta + \delta_{1,L} - \delta_{1,R}) + \frac{\alpha_{1,R}\alpha_{2,L}}{\alpha_{1,L}\alpha_{2,R}} S_2(t - \delta_{2,L} + \delta_{1,L} - \delta_{1,R}) \quad (16)$$

Figure 5A:
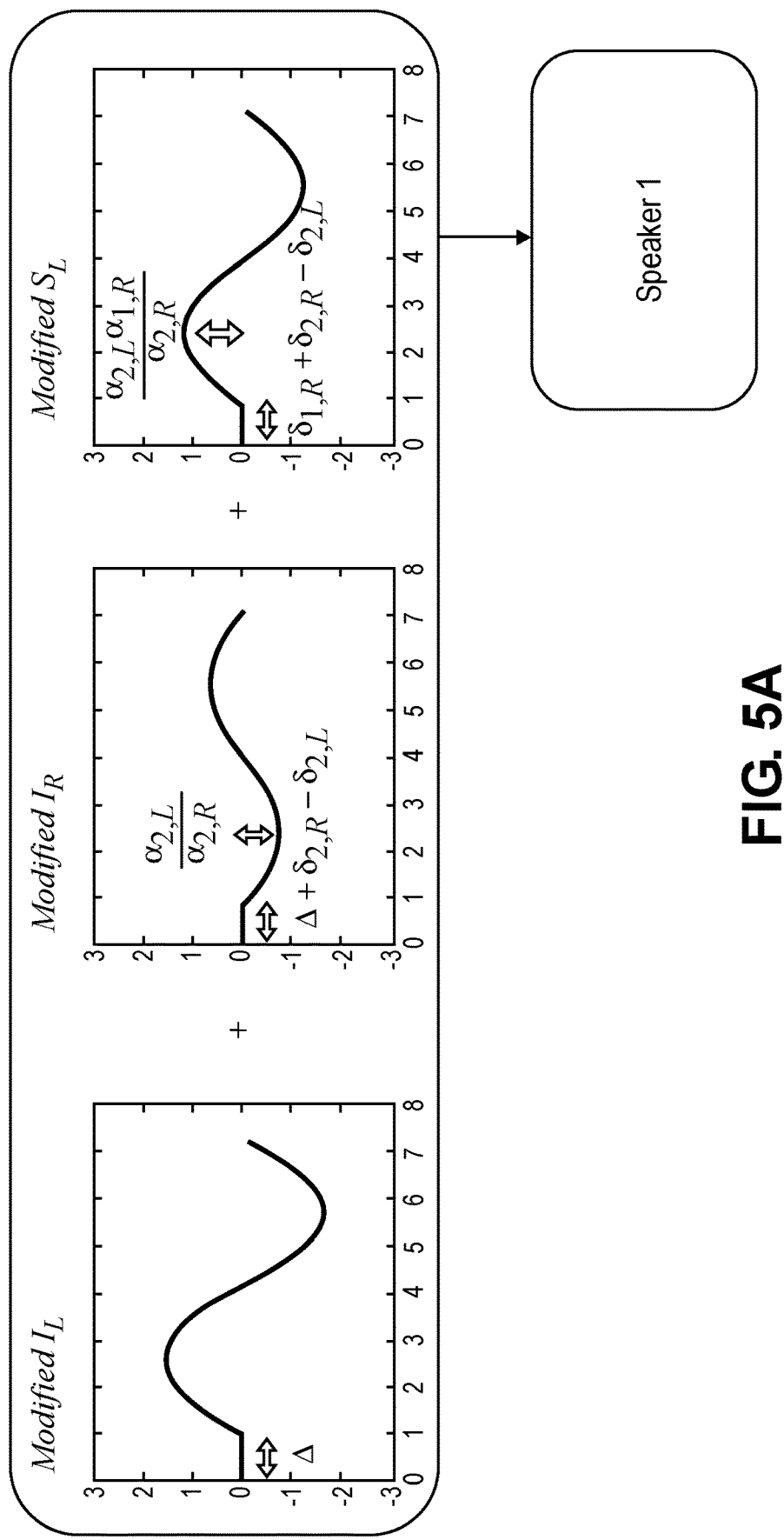
FIGS. 5A and 5B illustrate an embodiment of the invention.
Figure 5B:
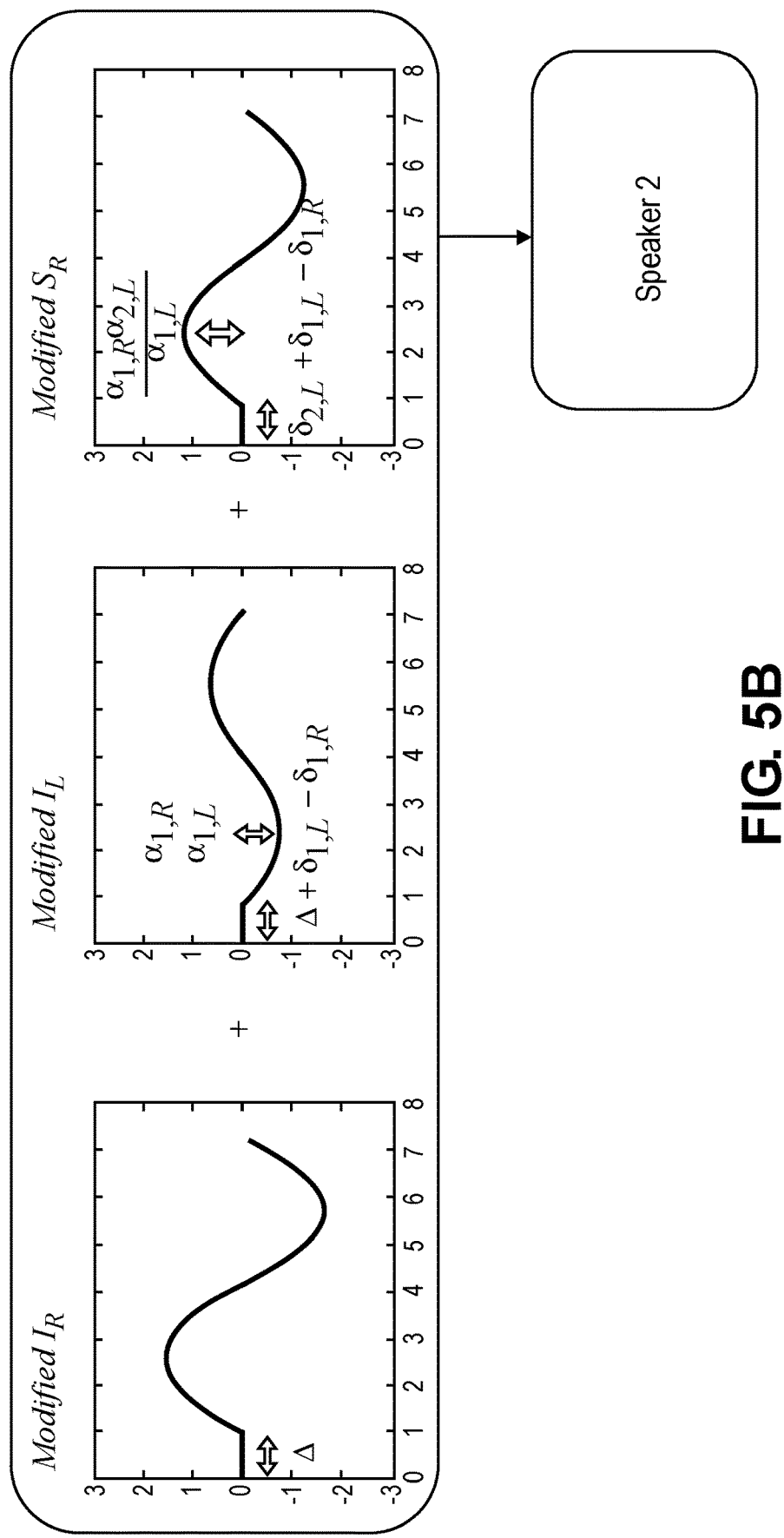

Signals $S_L$ and $S_R$, modified according to Equations (15) and (16), are input into Speakers $S_1$ and $S_2$, respectively, as graphically depicted in FIGS. 5A, and 5B, respectively.

Plugging equation (15) and equation (8) with a $\delta_{2,L}$ delay into equation (1) yields:

$$E_L(t) = \alpha_{1,L}(S_1(t - \delta_{1,L})) + \alpha_{2,L}(S_2(t - \delta_{2,L}))$$

$$E_L(t) = \alpha_{1,L}\left( \frac{1}{\alpha_{1,L}} I_L(t - \Delta) - \frac{\alpha_{2,L}}{\alpha_{1,L}\alpha_{2,R}} I_R(t - \Delta + \delta_{2,R} - \delta_{2,L}) + \frac{\alpha_{2,L}\alpha_{1,R}}{\alpha_{1,L}\alpha_{2,R}} S_1(t - \delta_{1,R} + \delta_{2,R} - \delta_{2,L}) \right) + \alpha_{2,L}\left( \frac{1}{\alpha_{2,R}} I_R(t - \Delta + \delta_{2,R} - \delta_{2,L}) - \frac{\alpha_{1,R}}{\alpha_{2,R}} S_1(t - \delta_{1,R} + \delta_{2,R} - \delta_{2,L}) \right)$$

Multiplying and simplifying yields:

$$E_L(t) = I_L(t - \Delta) - \frac{\alpha_{2,L}}{\alpha_{2,R}} I_R(t - \Delta + \delta_{2,R} - \delta_{2,L}) + \frac{\alpha_{2,L}\alpha_{1,R}}{\alpha_{2,R}} S_1(t - \delta_{1,R} + \delta_{2,R} - \delta_{2,L}) + \frac{\alpha_{2,L}}{\alpha_{2,R}} \left( I_R(t - \Delta + \delta_{2,R} - \delta_{2,L}) - \frac{\alpha_{1,R}\alpha_{2,L}}{\alpha_{2,R}} (S_1(t - \delta_{1,R} + \delta_{2,R} - \delta_{2,L})) \right)$$

Figure 6A:
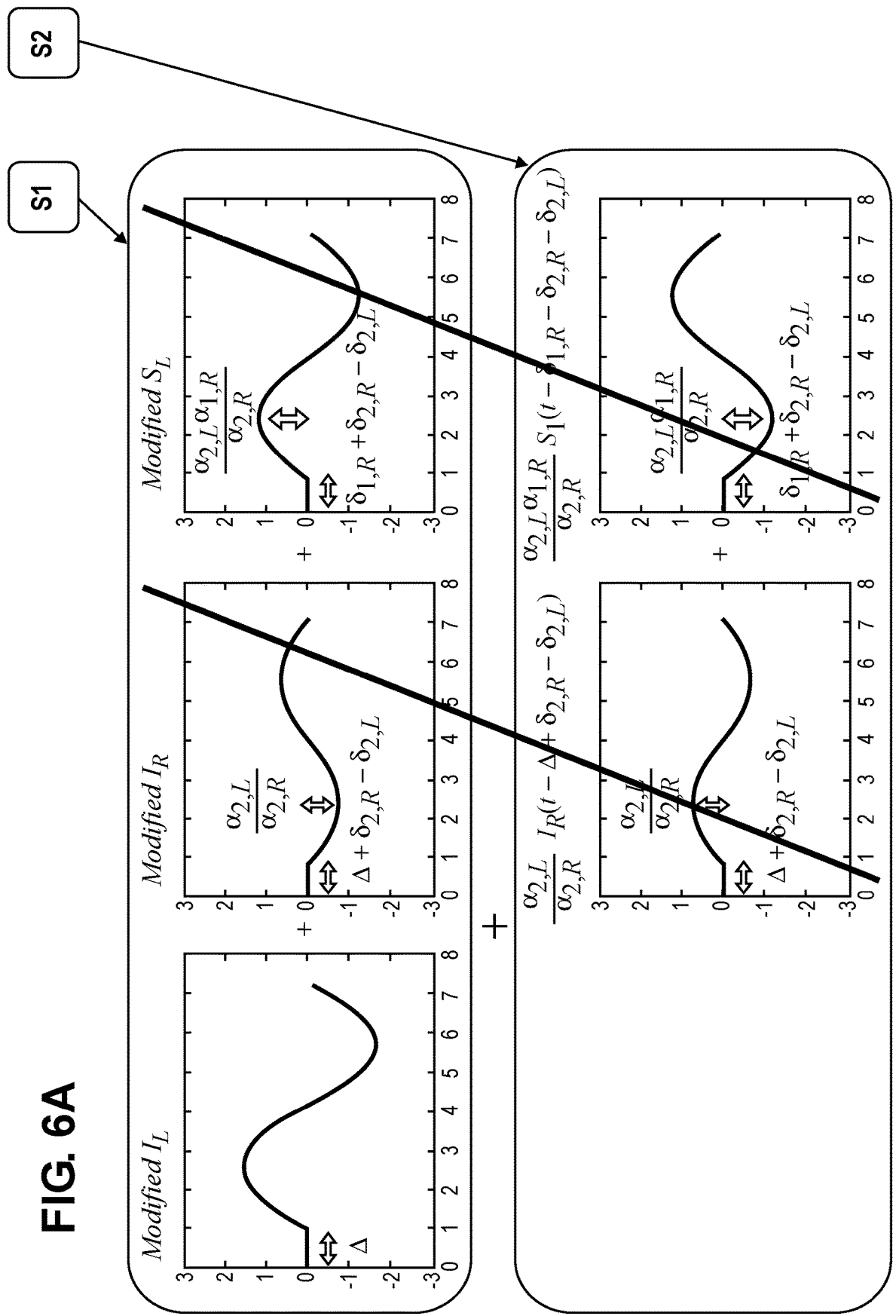
FIGS. 6A and 6B illustrate an embodiment of the invention.

The $I_R$'s and $S_L$'s cancel out, leaving what was wanted from equation (3), $E_L(t)=I_L(t-\Delta)$, as depicted in FIG. 6A.

Figure 6B:
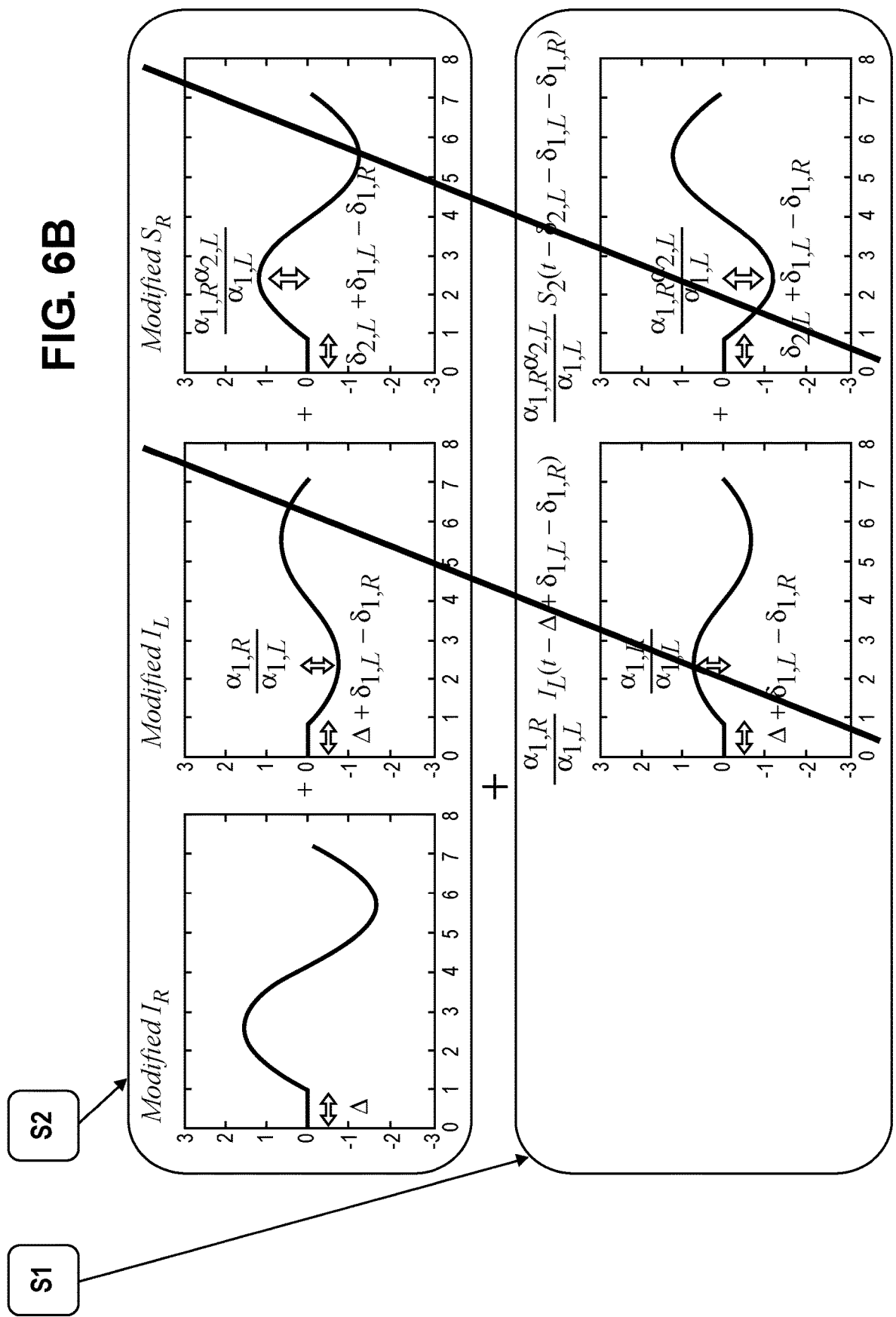

Similarly, for the right ear, a similar derivation is followed for equation (16), as depicted in FIG. 5B, and equation (6) with a $\delta_{1,R}$ delay into equation (1) resulting in $E_R(t)=I_R(t-\Delta)$, as depicted in FIG. 6B.

The algorithm according to the embodiments works in which $\delta_{1,R}+\delta_{2,L}>\delta_{1,L}+\delta_{2,R}$. If this is not the case, then flip the audio input channels with each other, and additionally change the input parameters accordingly.

It is appreciated that embodiments of the invention, with sufficient camera coverage of a room (or multiple rooms) so that objects can be identified in the room(s), or where the embodiments otherwise know the location of objects in the room(s) (e.g., through user input), embodiments may be used to locate a speaker-less (or muted or turned-off consumer electronic device) or object, for example, a user's mobile phone, key FOB, etc., by measuring the real-time distance between the location of the user and the object, and transmitting an audio signal (e.g., a ping sound) from each of at least two speakers in the room that is adjusted based on the respective location of the speakers, the object, and the location and orientation of the user's head, in accordance with the algorithms described herein, so that the user can aurally perceive where the object is located and walk to that location to find the object. In such an embodiment, The virtual sound source is placed at the same position as the physical "speaker-less" object, the spatial sound synthesis module processes the virtual sound into a spatialized binaural audio signal (with Left/Right channels), and the time-domain dynamic crosstalk cancellation module modifies the spatialized binaural audio signal to prepare it to be emitted from speakers in the room.

Multiple speakers or electronic devices with speaker capabilities, e.g., smart home hub 125A, smart thermostat 125B, and smart speakers 125C, receive the crosstalk cancelled spatial audio and output sound based on such. The goal of the embodiments is to provide users with a hands- and headset-free system in which they can experience spatial audio over multiple devices, such as connected IoT devices. The embodiments' dynamic time-domain crosstalk cancellation algorithm takes the position of each speaker relative to each ear of the user and modifies the output sound signal, both in amplitude and timing, to minimize or prevent crosstalk. In this manner, a user is able to walk around a given room with their head being tracked and hear spatial audio, without headsets.

According to one embodiment, the virtual sound source 105 that places sounds may be a game engine. A game engine is a software-development environment designed for people to build video games. Developers use game engines to construct games for consoles, mobile devices, and personal computers. The core functionality typically provided by a game engine includes a rendering engine ("renderer") for 2D or 3D graphics, a physics engine, sound, scripting, animation, artificial intelligence, networking, streaming, memory management, threading, localization support, scene graph, and may include video support for cinematics. Implementers often economize on the process of game development by reusing/adapting, in large part, the same game engine to produce different games or to aid in porting games to multiple platforms. According to one embodiment, the Unity Game Engine is used to place the virtual sounds. Unity is a cross-platform game engine developed by Unity Technologies, initially a Mac OS X game engine, which has since been extended to support dozens of platforms.

According to one embodiment, the virtual reality (VR) tracking module may be something as simple as a webcam and associated software. According to another embodiment, the VR tracking module uses the HTC Vive to provide user head location. The HTC Vive is a virtual reality headset developed by HTC and Valve. The headset uses "room scale" tracking technology, allowing the user to move in 3D space and use motion-tracked handheld controllers to interact with the environment.

Room-scale, or roomscale, is a design paradigm for (VR) experiences which allows users to freely walk around a play area, with their real-life motion reflected in the VR environment. Using 360 degree tracking equipment such as infrared sensors, the VR system monitors the user's movement in all directions, and translates this into the virtual world in real-time. This allows the player to perform tasks, such as walking across a room and picking up a key from a table, using natural movements. The HTC Vive virtual-reality system incorporates room-scale tracking in its core design, using two infrared tracking stations located in opposite corners of the room to monitor the movement of the player.

According to one embodiment, the spatial sound synthesis module 115 uses Google's Resonance Audio to generate spatial audio by translating the spatial virtual sound into two-channel audio signals.

In embodiments of the invention implemented with the Unity game engine as the virtual sound source 105 and Google's Resonance Audio as the spatial sound synthesis module 115, the Unity game engine uses Resonance Audio as a Unity plugin. The plugin from Resonance Audio generates spatialized audio which is transmitted from the Unity game engine audio mixer.

The crosstalk cancellation module 120 receives the spatialized audio transmitted by the Unity game engine audio mixer and, using the below disclosed algorithm, receives the user's head position and orientation in relation to the speaker positions, and preprocesses the audio channel values for crosstalk cancellation. The audio channel values, adjusted for crosstalk cancellation, are then transmitted to the speakers. The speakers, in turn, output sound corresponding to the crosstalk canceled spatial audio.

Spatial audio crosstalk cancellation is performed, according to embodiments of the invention, according to the following algorithm:

```
procedure crossBlock inputs: { DeltaSamples_Speaker1_to_Ear1, DeltaSamples_Speaker1_to_Ear2,
    DeltaSamples_Speaker2_to_Ear1, DeltaSamples_Speaker2_to_Ear2,
    alpha_Speaker1_to_Ear1, alpha_Speaker1_to_Ear2, alpha_Speaker2_to_Ear1,
    alpha_Speaker2_to_Ear2, first_flag, both channels of inputAudioBuffer_frame, both
    channels of outputAudioBuffer_frame, previous_inputaudiobuffer_frame_channel1,
    previous_inputaudiobuffer_frame_channel2,
    previous_outputaudiobuffer_frame_channel1,
    previous_outputaudiobuffer_frame_channel2 }
IF (DeltaSamples_Speaker1_to_Ear1 + XT_deltaLR) >
(DeltaSamples_Speaker1_to_Ear2 + DeltaSamples_Speaker2_to_Ear1) THEN
    Flip the values of DeltaSamples_Speaker1_to_Ear1 and
    DeltaSamples_Speaker1_to_Ear2,
    Flip the values of DeltaSamples_Speaker2_to_Ear1 and
    DeltaSamples_Speaker2_to_Ear2,
    Flip the values of alpha_Speaker1_to_Ear1, alpha_Speaker1_to_Ear2,
    Flip the values of alpha_Speaker2_to_Ear1, alpha_Speaker2_to_Ear2
ENDIF
Triangle_delta = DeltaSamples_Speaker2_to_Ear1 + DeltaSamples_Speaker1_to_Ear2 −
minimum(DeltaSamples_Speaker1_to_Ear1, DeltaSamples_Speaker2_to_Ear2);
Triangle_delta = maximum(maximum(DeltaSamples_Speaker2_to_Ear1,
DeltaSamples_Speaker1_to_Ear2), Triangle_delta) + 1;
Triangle_delta_minus_delta21 = Triangle_delta − DeltaSamples_Speaker2_to_Ear1;
Triangle_delta_minus_delta12 = Triangle_delta − DeltaSamples_Speaker1_to_Ear2;
Delta_one = Triangle_delta + DeltaSamples_Speaker1_to_Ear1 −
DeltaSamples_Speaker2_to_Ear1 − DeltaSamples_Speaker1_to_Ear2;
Delta_two = Triangle_delta + DeltaSamples_Speaker2_to_Ear2 −
DeltaSamples_Speaker2_to_Ear1 − DeltaSamples_Speaker1_to_Ear2;
Delta_three = DeltaSamples_Speaker1_to_Ear1 + DeltaSamples_Speaker2_to_Ear2 −
DeltaSamples_Speaker2_to_Ear1 − DeltaSamples_Speaker1_to_Ear2;
arraylength = length of inputAudioBuffer_frame
iterationlength = arraylength / 2;
// If the audiobuffer frame has interleaved channels then,
// Channel 2 represents odd values and Channel 1 represents even values
SET input_audiobuffer_channel2 to inputAudioBuffer_frame's channel 2
SET input_audiobuffer_channel1 to inputAudioBuffer_frame's channel 1
SET output_audiobuffer_channel2 to outputAudioBuffer_frame's channel 2
SET output_audiobuffer_channel1 to outputAudioBuffer_frame's channel 1
FOR i = 0 to iterationlength
```

-continued

| procedure crossBlock |
|---|

```
output_audiobuffer_channel2[i] = (1 / alpha_Speaker2_to_Ear1)
    * linearinterpolation_previousvalues(input_audiobuffer_channel,
    Triangle_delta_minus_delta21, i, first_flag,
    previous_inputaudiobuffer_frame_channel1) - (alpha_Speaker1_to_Ear1 /
    alpha_Speaker2_to_Ear1)
    * ((1 / alpha_Speaker1_to_Ear2)
    * linearinterpolation_previousvalues(input_audiobuffer_channel2, Delta_one,
    i, first_flag, input_audiobuffer_channel2) - (alpha_Speaker2_to_Ear2 /
    alpha_Speaker1_to_Ear2)
    * linearinterpolation_previousvalues(output_audiobuffer_channel2,
    Delta_three, i, first_flag, previous_outputaudiobuffer_frame_channel2));
output_audiobuffer_channel1 = (1 / alpha_Speaker1_to_Ear2)
    * linearinterpolation_previousvalues(input_audiobuffer_channel2,
    Triangle_delta_minus_delta12, i, first_flag, output_audiobuffer_channel2) -
    (alpha_Speaker2_to_Ear2 / alpha_Speaker1_to_Ear2)
    * ((1 / alpha_Speaker2_to_Ear1)
    * linearinterpolation_previousvalues(input_audiobuffer_channel1, Delta_two,
    i, first_flag, previous_inputaudiobuffer_frame_channel1) -
    (alpha_Speaker1_to_Ear1 / alpha_Speaker2_to_Ear1)
    * linearinterpolation_previousvalues(output_audiobuffer_channel1,
    Delta_three, i, first_flag, previous_outputaudiobuffer_frame_channel2));
ENDFOR
IF (DeltaSamples_Speaker1_to_Ear1 + XT_deltaLR) >
(DeltaSamples_Speaker1_to_Ear2 + DeltaSamples_Speaker2_to_Ear1) THEN
    SET outputAudioBuffer_frame's channel 2 values equal to
    output_audiobuffer_channel2;
    SET outputAudioBuffer_frame's channel 1 values equal to
    output_audiobuffer_channel1;
ELSE
    SET outputAudioBuffer_frame's channel 2 values equal to
    output_audiobuffer_channel1;
    SET outputAudioBuffer_frame's channel 1 values equal to
    output_audiobuffer_channel2;
ENDIF
procedure linearinterpolation_previousvalues(inputArray,
delayinput, index, first_flag, buffer_saved)
    delayCeiling = ceil(delayinput);
    delayFloor = floor(delayinput);
    delay = delayinput - delayFloor;
    delayinv = 1 - delay;
IF (first_flag == true) THEN
    IF (index - delayCeiling) < 0 THEN
        return 0;
    ELSE
        return delay * inputArray[index - delayCeiling] + delayinv *
        inputArray[index - delayFloor];
    ENDIF
ELSE
    IF (index - delayCeiling < 0) && (index - delayFloor < 0) THEN
        return delay * buffer_saved[bufferlength - (delayCeiling - index)] +
        delayinv * buffer_saved[bufferlength - (delayFloor - index)];
    ELSE IF (index - delayCeiling < 0) && (index - delayFloor == 0)
        return delay * buffer_saved[bufferlength - (delayCeiling - index)] +
        delayinv * inputArray[(index - delayFloor)];
    ELSE
        return delay * inputArray[(index - delayCeiling)] + delayinv *
        inputArray[(index - delayFloor)];
    ENDIF
ENDIF
```

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or selectively activated or configured by a computer program stored in one or more computers. Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. In addition, embodiments of the invention are not described with reference to any particular programming language. It will be appreciated that a variety of programming languages may be used to implement the embodiments of the invention as described herein.

The invention claimed is:

1. A system to output a cross-talk cancelled spatial audio signal to two speakers, comprising:
   a user tracking module to provide a location and orientation of a head of a user; and
   a time-domain dynamic crosstalk cancellation module comprising two synchronized channels: a left channel destined for the left ear of the user and a right channel destined for the right ear of the user, the time-domain dynamic crosstalk cancellation module to:
   receive a spatial audio signal;
   receive the location and orientation of the head of the user from the user tracking module;
   receive a location for each of the two speakers;
   calculate a distance between each speaker and each ear of the user based on the location and orientation of the head of the user, and the locations of the speakers;
   calculate a spatial audio attenuation value and time delay value for the left channel and the right channel of the spatial audio signal based on the calculated distance between each speaker and each ear of the user and the speed of sound;
   apply the respective attenuation value and time delay value to the left channel and the right channel of the spatial audio signal, thereby creating a modified left channel and a modified right channel of the spatial audio signal; and
   transmit the modified left channel to a first of the two speakers ("the first speaker") and the modified right channel to a second of the two speakers ("the second speaker");
   capture and invert the transmitted modified left channel of the spatial audio signal thereby creating an inverted modified left channel of the spatial audio signal;
   transmit the inverted modified left channel of the spatial audio signal to the second speaker;
   capture and invert the transmitted modified right channel of the spatial audio signal thereby creating an inverted modified right channel of the spatial audio signal;
   transmit the inverted modified right channel of the spatial audio signal to the first speaker;
   the first speaker to transmit the modified left channel and the inverted modified right channel of the spatial audio signal;
   the second speaker to transmit the modified right channel and the inverted modified left channel of the spatial audio signal;
   wherein the inverted modified right channel of the spatial audio signal transmitted by the first speaker and the modified right channel of the spatial audio signal transmitted from the second speaker cancel each other out so that the left ear of the user hears just the first modified channel; and
   wherein the inverted modified left channel of the spatial audio signal transmitted by the second speaker and the modified left channel of the spatial audio signal transmitted from the first speaker cancel each other out so that the left ear of the user hears just the second modified channel.

2. The system of claim 1, further comprising:
   a virtual audio source to provide a virtual audio signal; and
   a spatial audio synthesis module to receive the virtual audio signal from the virtual audio source, and to receive the location and orientation of the head of the user from the user tracking module, and generate the spatial audio signal based thereon.

3. The system of claim 1, wherein the user tracking module to provide a location and orientation of a head of a user is selected from one of a virtual reality tracking module, a video camera tracking module, and an infrared radiation tracking module.

4. A method for providing a cross-talk cancelled spatial audio signal, comprising two synchronized channels: a left channel destined for the left ear of the user and a right channel destined for the right ear of the user, to two speakers, comprising:
   receiving input regarding a location and orientation of a head of a user;
   receiving input regarding the location of each of two speakers; and
   receiving a spatial audio signal; and
   calculating a distance between each speaker and each ear of the user based on the location and orientation of the head of the user, and the locations of the speakers;
   calculating a spatial audio attenuation value and time delay value for the left channel and the right channel of the spatial audio signal based on the calculated distance between each speaker and each ear of the user and the speed of sound;
   applying the respective attenuation value and time delay value to the left channel and the right channel of the spatial audio signal, thereby creating a modified left channel and a modified right channel of the spatial audio signal; and transmit the modified left channel to a first of the two speakers ("the first speaker") and the modified right channel to a second of the two speakers ("the second speaker");

capture and invert the transmitted modified left channel of the spatial audio signal thereby creating an inverted modified left channel of the spatial audio signal;

transmit the inverted modified left channel of the spatial audio signal to the second speaker;

capture and invert the transmitted modified right channel of the spatial audio signal thereby creating an inverted modified right channel of the spatial audio signal;

transmit the inverted modified right channel of the spatial audio signal to the first speaker;

transmitting via the first speaker the modified left channel and the inverted modified right channel of the spatial audio signal;

transmitting via the second speaker the modified right channel and the inverted modified left channel of the spatial audio signal;

wherein the inverted modified right channel of the spatial audio signal transmitted by the first speaker and the modified right channel of the spatial audio signal transmitted from the second speaker cancel each other out so that the left ear of the user hears just the first modified channel; and wherein the inverted modified left channel of the spatial audio signal transmitted by the second speaker and the modified left channel of the spatial audio signal transmitted from the first speaker cancel each other out so that the right ear of the user hears just the second modified channel.

5. The method of claim 4, further comprising:

receiving a virtual audio signal; and generating the spatial audio signal based on the virtual audio signal and the location and orientation of the head of the user.

* * * * *